Patented June 19, 1923.

1,459,124

UNITED STATES PATENT OFFICE.

HYLEMAN ALISON WEBSTER, OF COLUMBIA, TENNESSEE.

CONTINUOUS PROCESS OF MAKING SUPERPHOSPHATE.

No Drawing.  Application filed May 20, 1922. Serial No. 562,558.

*To all whom it may concern:*

Be it known that I, HYLEMAN ALISON WEBSTER, a citizen of the United States, residing at Columbia, in the county of Maury and State of Tennessee, have invented certain new and useful Improvements in Continuous Processes of Making Superphosphate; and I do hereby declare the following to be a full, clear, and exact description of the invention, such as will enable others skilled in the art to which it appertains to make and use the same.

This invention relates to a continuous process of making superphosphates from low grade phosphate rock, and has for its object to lessen the cost, and to increase the efficiency of the methods heretofore proposed.

With these and other objects in view, the invention consists in the novel steps and combinations of steps constituting the process, all as will be more fully hereinafter disclosed and particularly pointed out in the claims.

In order that the invention may be the more clearly understood, it is said: It is well recognized that in making what is known commercially as super-phosphates, or products containing a mixture of mono-calcium phosphate and di-calcium phosphate, from phosphate rock, it has not prior to this invention been considered practicable to employ a grade of phosphorite containing less than say 70% of tri-calcium phosphate or more than say 5% of iron and aluminum oxides combined. And it is further well known that it has been found necessary to use for each 1000 pounds of said rock from 900 to 1000 pounds of sulphuric acid of 52° Bé.

In carrying out this invention, on the other hand, I am enabled to employ a much lower grade of rock than has been found commercially practicable heretofore, and therefore, am enabled to bring into the market large quantities of low grade phosphorite that at present have comparatively little value.

In practice I proceed as follows: The rock is finely subdivided, and the powder thus produced is placed in mixing tanks provided with stirrers, and steam coils for heating said powder. To these tanks are added for each 1000 pounds of rock powder about 1000 pounds of water, and the mixture stirred to place all particles of rock in suspension. In tanks for each 1000 pounds of rock powder there is placed about 600 pounds of 60° Bé. sulphuric acid, and to each 600 pounds of this acid is added about 1000 pounds of water.

The dilute acid thus obtained is now transferred as rapidly as possible to the rock powder while the latter still forms the above mentioned suspension in water, so the acid may immediately attack all the suspended particles of rock. But owing to the relatively small quantity of acid, it converts a portion only of the tri-calcium phosphate present into mono-calcium phosphate, $CaH_4P_2O_8$, along with some di-calcium phosphate $Ca_2H_2P_2O_8$. The reaction almost immediately produces in the mixture a colloidal sponge like mass and this mass is left undisturbed for about thirty minutes in order that the reaction may be completed. After this 1000 pounds of additional water is added to each 1000 pounds of rock present, and the mass stirred. The agitation of the mass causes the undissolved particles of the rock powder to be freed from the colloidal mass in the suspension, while the colloidal matter separates from said particles in the form of a thin emulsion. The surfaces of said undissolved and partially dissolved particles of rock having been thus bared or cleaned from the colloidal matter, the temperature of the mixture, which will be found to be about 30° C. is now raised. When said temperature reaches about 60° C., hydrolysis sets in, and this latter action reaches a maximum activity when the temperature reaches about 85° C. Artificial heating is now stopped, when it is found that the chemical heat generated will continue to raise the temperature of the mass to usually 92° C. and often as high as to 96° C.

During the hydrolytic action just described, the mono-calcium phosphate, $CaH_4P_2O_8$ present is broken down into di-calcium phosphate, $Ca_2H_2P_2O_8$ and calcium pyro-phosphate. $Ca_2P_2O_7$, and also into ortho-phosphoric acid, $H_3PO_4$.

The ortho-phosphoric acid thus produced immediately attacks the suspension or the particles of rock powder left unattacked, or partially attacked, by the original dilute sulphuric acid, and whose surfaces are now clean, or bared as above stated.

This action produces more mono-calcium phosphate and di-calcium phosphate, and it finally results that all the original tri-calcium phosphate present is converted into soluble phosphates. That is, I am enabled by this procedure to use a very much less quantity of sulphuric acid to each 1000 pounds of rock, than has heretofore been found possible, and still to render available all the phosphate present. This result is attained whether high grade or low grade prosphates are employed, and no matter what may be their content of iron and aluminum oxides. That is, the sulphuric acid is employed in connection with a hydrolytic action to produce ortho-phosphoric acid, and the latter completes the conversion of the insoluble phosphates into the soluble form.

The di-calcium phosphate and the calcium pyro-phosphate together with any calcium sulphate and other impurities present will precipitate out as solids, while the mono-calcium phosphate will remain in solution. The solids are separated out by any suitable method such as decantation, or filtration, and are also dried by any suitable and well known means.

A second batch of rock powder is next prepared as before, and a second batch of sulphuric acid of 60° Bé. having been provided, diluted with water and mixed with said powder to produce the colloidal and sponge like mass, and the mixture having been allowed to stand for about thirty minutes as before instead of adding an additional quantity of water as in the preceding case, one now adds the solution of mono-calcium phosphate derived from the preceding operation. That is, to this second formed colloidal mass one adds about 1000 pounds of said solution to each 1000 pounds of rock powder in the second batch.

The process using this second batch of material, is now carried on as before and new solids containing di-calcium phosphate precipitated and recovered, and a new solution of mono-calcium phosphate obtained.
The process is thus made continuous and may be repeated as just outlined on additional new batches of rock powder as long as one desires. In the treatment of each succeeding batch of rock powder, the solutions of mono-calcium phosphate get more concentrated and finally become saturated, whereupon mono-calcium phosphate is precipitated out with the solids. The final product, constituting the desired super-phosphate, however, always contains a large excess of di-calcium phosphate over the mono-calcium phosphate content. It is dry, free from sticky and gummy constituents, will keep in this condition in any climate, and will readily pass through the drills used to spread fertilizers on the soil.

The advantages of the foregoing procedure may be further realized when it is said: This process has an advantage over all others in that it will make a merchantable standard 16% acid phosphate from a low grade phosphate rock running as low as 60% tri-calcium phosphate, or about 12% below any Tennessee rock now in commercial use. It may even be employed on a rock running as high as 8% or 10% iron and aluminum oxides combined. Under ordinary methods it would be impossible to use such a low grade rock on account of its low content of tri-calcium phosphate and also on account of the high content of iron and aluminum oxides. In prior methods, the iron and aluminum oxides consume large portions of the sulphuric acid, that would be available for combination with the tri-calcium phosphate were the iron and aluminum oxides not present; and further, the iron and aluminum oxides produce hydroscopic compounds which make against the non-sticky or non-gummy physical conditions desired in the finished product. This present process has a further advantage of yielding a product which can be shipped the same day it is made, because its physical condition permits of immediate artificial drying, while the products of the prior processes cannot be shipped under periods of from ninety to a hundred days.

It is obvious that those skilled in the art may vary the details of the process without departing from the spirit of the invention. For example, phosphoric, hydrochloric and other acids may be substituted for the sulphuric acid mentioned, and the quantities of each acid varied. Therefore, I do not wish to be limted to the foregoing procedure except as may be required by the claims.

What is claimed is:

1. The process of making superphosphate from phosphorite rock which consists in powdering said rock; suspending said rock powder in water; treating the suspension thus produced with sulphuric acid; diluting with water said suspension after treatment with acid and raising the temperature above 60° C. to bring on a hydrolytic action; and separating out the super-phosphate thus produced, substantially as described.

2. The process of making super-phosphate from phosphorite rock which consists in powdering said rock; suspending said rock powder in a weight of water more than one and one half times the weight of said rock; treating the suspension thus produced with a dilute sulphuric acid; leaving the mixture to stand until the action between said rock and acid is substantially complete; diluting with water said suspension after treatment with acid and raising the temperature above 60° C. to bring on a hydrolytic action; and separating out the super-phosphate solids thus produced, substantially as described.

3. The process of making super-phosphate from phosphate rock which consists in finely dividing said rock to produce a rock powder; suspending said powder in water; adding dilute sulphuric acid to the suspension thus produced to form a colloidal mass; adding additional water to said mass; raising the temperature of the mixture to above 60° C. to produce a hydrolytic action therein; and separating out the super-phosphate thus produced, substantially as described.

4. The continuous process of making super-phosphate from phosphate rock which consists in finely dividing said rock to form a powder; to one portion of said powder adding water to form a suspension; adding dilute sulphuric acid to said suspension to partially decompose the phosphate present; adding water containing some mono-calcium phosphate to the treated suspension to dilute the same; raising the temperature to above 60° C. to start a hydrolytic action in the mixture; and separating out the di-calcium phosphate thus formed, substantially as described.

5. The continuous process of making super-phosphate from phosphate rock which consists in finely dividing said rock to form a powder; to one portion of said powder adding water to form a suspension; adding dilute sulphuric acid to said suspension in a quantity sufficient to only partially decompose the phosphate present; adding water containing some mono-calcium phosphate derived from a previous operation to the treated suspension to dilute the same; raising the temperature to above 60° C. to start a hydrolytic action in the mixture; cutting off the heat when said temperature rises above 80° C.; and separating out the di-calcium phosphate thus formed, substantially as described.

6. The continuous process of making super-phosphate from low grade phosphate rock which consists in finely dividing said rock to form a powder; to one portion of said powder adding water to form a suspension; adding dilute sulphuric acid to said suspension in a quantity sufficient to only partially decompose the phosphate present; adding water containing some mono-calcium phosphate to the treated suspension after the reaction between the rock and acid is complete to dilute the same; raising the temperature to above 60° C. to start a hydrolytic action in the mixture; and separating out the di-calcium phosphate thus formed, substantially as described.

In testimony whereof I affix my signature.

HYLEMAN ALISON WEBSTER.